United States Patent [19]

Nomura

[11] 4,022,977
[45] May 10, 1977

[54] AUTOMATIC METER-READING AND CONTROLLING SYSTEM

[75] Inventor: Jutaro Nomura, Amagasaki, Japan

[73] Assignee: Mitsubishi Denki Kabushiki Kaisha, Tokyo, Japan

[22] Filed: Dec. 17, 1975

[21] Appl. No.: 641,496

Related U.S. Application Data

[63] Continuation-in-part of Ser. No. 456,445, April 1, 1974, abandoned, which is a continuation-in-part of Ser. No. 328,485, Jan. 31, 1973, abandoned.

[30] Foreign Application Priority Data

| July 14, 1972 | Japan | 47-83178 |
| July 29, 1972 | Japan | 47-76219 |
| July 11, 1972 | Japan | 47-69380 |
| July 14, 1972 | Japan | 47-70562 |

[52] U.S. Cl. .............. 179/2 AM; 340/151
[51] Int. Cl.² ............................. H04M 11/00
[58] Field of Search ............... 179/2 AM, 2 A, 2 R; 340/149, 150, 151, 177 VA

[56] References Cited

UNITED STATES PATENTS

| 3,414,676 | 12/1968 | Long | 179/2 AM |
| 3,588,889 | 6/1971 | Schulein | 340/149 |
| 3,742,454 | 6/1973 | Baker | 340/151 |
| 3,825,733 | 7/1974 | White | 340/151 |

Primary Examiner—William C. Cooper
Assistant Examiner—Joseph A. Popek
Attorney, Agent, or Firm—Oblon, Fisher, Spivak, McClelland & Maier

[57] ABSTRACT

An automatic meter-reading system monitors broadly distributed utility meters over a communication link by indirectly measuring the resistance value representative of the digit shown on the meter from calculation using the equation derived from the theory of four-terminal network. Based on the similar principle, an automatic remote controlling system monitors the answerback signal representative of the condition of the controlled equipment at a remote station. Similarly, an automatic meter-reading system monitors a telephone subscriber's telephone call meter centrally located in a telephone exchange office.

10 Claims, 11 Drawing Figures

AUTOMATIC METER-READING AND CONTROLLING SYSTEM

CROSS REFERENCE TO RELATED APPLICATIONS

This application is a continuation-in-part of abandoned patent application Ser. No. 456,445 filed Apr. 1, 1974, entitled AUTOMATIC METER-READING AND CONTROLLING SYSTEM which in turn is a continuation-in-part of abandoned patent application Ser. No. 328,485 filed Jan. 31, 1973, entitled AUTOMATIC METER-READING AND CONTROLLING SYSTEM.

BACKGROUND OF THE INVENTION

1. Field of the Invention

The present invention generally relates to an automatic remote meter-reading system for encoding indicative information of meters for electric, gas or water service scattered in a broad area and further encoding an index of a meter centrally set up in an automatic exchange office, in the form of a resistance by a resistive encoder, and detecting an unknown resistance of the encoder through an automatic switching system and/or a controlling system for obtaining an answer back signal by remote-controlling various terminal equipment placed at each terminal of a communication link.

2. Description of the Prior Art

Various automatic remote meter-reading system for providing automatic meter-reading have been proposed to remotely determine a service fee of electric, gas or water service supplied to a consumer by a public service office.

In the past, A.C. signal systems have been employed as a signal system for transmitting meter information to a meter-reading center. However, such systems were difficult to practically apply from an economical viewpoint. Similarly, in the past, D.C. pulse signal systems were used but were also economically difficult to practically apply. In a system for detecting a resistance value representative the digit shown on the meter from a meter-reading center, the meter-reading line length is broadly changed and the condition of a meter-reading line, being affected by weather, is unstable. There have been various problems in this respect in the past.

It has also been considered difficult to economically apply automatic meter-reading of a subscriber's telephone call meters centrally set up in an automatic exchange office. There has been in the past no practical system for the automatic reading of a subscriber's telephone call meter except accumulating the call records in a memory of an electronic switching system, and a remote controlling system which requires an answer-back signal corresponding to the condition of the controlled equipment has been also economically difficult to practically apply for homely use.

SUMMARY OF THE INVENTION

Accordingly, one object of the present invention is to provide a new and improved unique meter reading and/or controlling system. Another object of the present invention is to provide a new and improved unique meter reading and/or controlling system which is not affected by communication line length and weather.

A further object of the present invention is to provide a new and improved unique meter reading and/or controlling system which centrally monitors a plurality of meters broadly distributed through a communication line and/or a plurality of telephone subscriber's telephone call meter centrally located in a telephone exchange office.

One other object of the present invention is the provision of a new and improved unique meter reading and/or controlling system which is economically feasible.

Briefly, in accordance with this invention, the foregoing and other objects are in one aspect attained by combining computerized scanning control method and the theory of four-terminal network applied to the four-terminal network including a communication line which is considered as a "black-box."

For the present automatic meter-reading system for gas or water meter does not need an individual power supply at a remote station. The present meter-reading and/or controlling system comprises apparatus for alerting terminal meter-reading equipment or terminal controlling equipment scattered in a broad area by program control of a central processor in a meter-reading and/or controlling center; progressively connecting at least 3 known reference resistors to output terminals of the four-terminal network having the communication line by a remote-controlled scanner; progressively connecting an unknown output resistance of a resistive encoder corresponding to the information indicative of an electric, gas or water service meter or a predetermined resistance indicating an answer-back signal of a controlled piece of equipment by said scanner; and measuring an input current from a stabilized voltage supply or a voltage drop of a detecting resistor caused by said input current, whereby an encoder resistance and/or said predetermined resistance can be calculated from said measured values and the predetermined resistance values of said known reference resistors by the central processor so as to immediately determine the indicative information and/or so as to find the condition of the controlled equipment by detecting and checking the predetermined resistance.

The system can be applied when a plurality of the terminal meter reading equipment or the terminal controlling equipment is connected to one communication link. The meter-reading of the subscriber's meter centrally located in the automatic exchange office, can be performed from the central processor by driving the scanner which is commonly used by subscribers and is set up in the automatic exchange office, and detecting an unknown resistance of the resistive encoder interlocked to the meter by using one wire of the communication link of the automatic switching system to provide an economical meter-reading system.

When the subscriber originates during the engaged period for meter-reading or controlling, this fact is automatically indicated in the meter-reading center in order to forcibly release the connection for meter-reading or controlling.

BRIEF DESCRIPTION OF THE DRAWINGS

A more complete appreciation of the invention will be readily obtained as the same becomes better understood by reference to the following detailed description when considered in connection with the accompanying drawings, wherein:

FIG. 3 illustrates another embodiment of the present invention wherein a plurality of parallel connected coupler units are alerted by a D.C. address and alert signal on the communication line; and FIG. 4 illustrates another embodiment of the present invention wherein a plurality of series connected coupler units are alerted by a D.C. voltage applied to the telephone line.

DETAILED DESCRIPTION OF THE PREFERRED EMBODIMENTS

Figure 1:
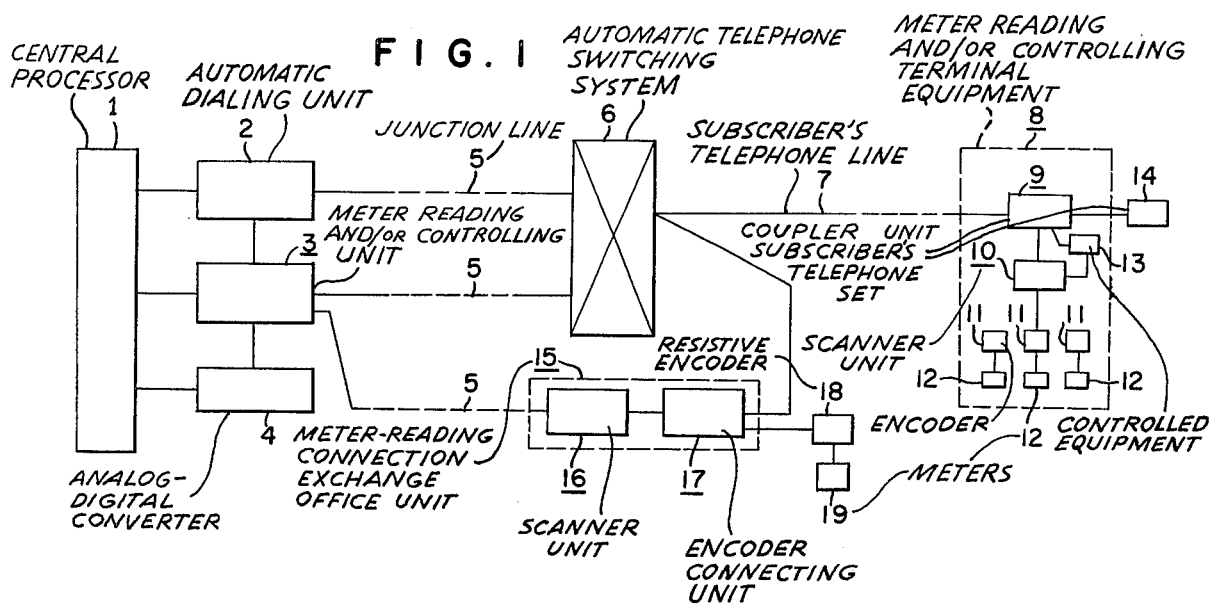
FIG. 1, is a block diagram of a preferred embodiment of an automatic meter-reading and/or controlling system according to the present invention.
Figure 2:
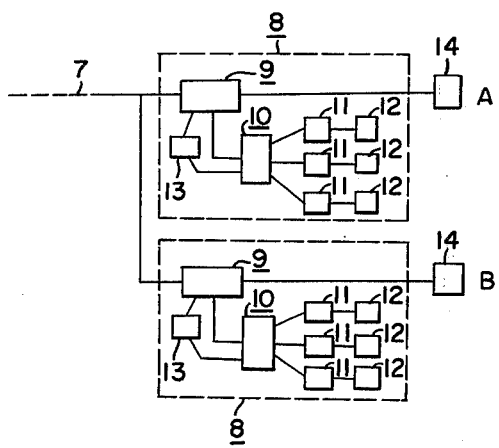
FIGS. 2, 3 and 4 are respectively diagrams of a terminal side of a telephone line including a plurality of meter-reading terminal equipment or controlling terminal equipment connected to one telephone line, wherein FIG. 2 more specifically illustrates one embodiment having two cross-connected coupler units alerted by a D.C. voltage on a communication line.
Figure 3:
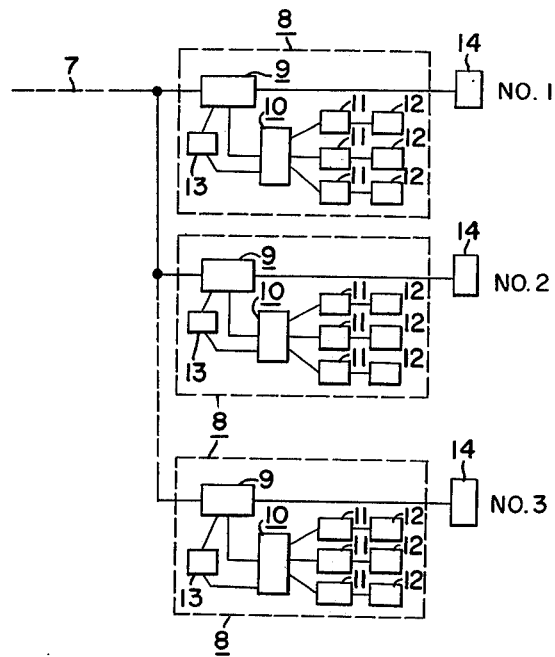
Figure 4:
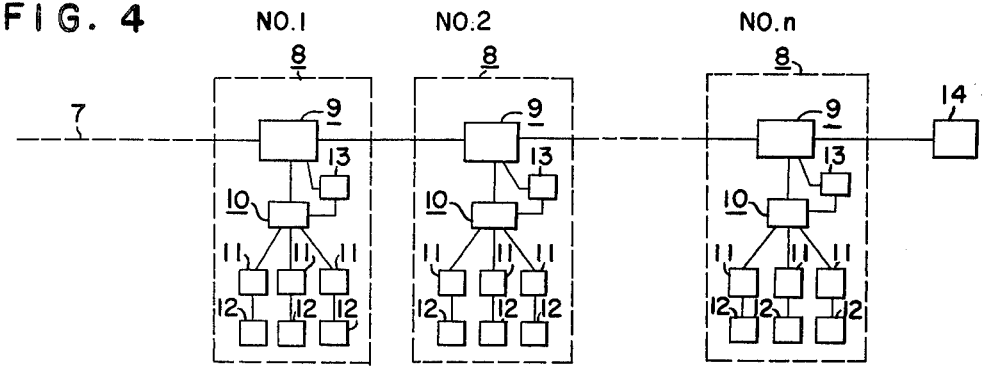

Referring now to the drawings wherein like reference numerals designate identical or corresponding parts throughout the several views, and more particularly to FIG. 1 which is a diagram of a total system of one preferred embodiment of the automatic meter-reading and/or controlling system according to this invention. In FIG. 1, a central processor 1 controls the system under a program and calculates a resistance of an encoder or a predetermined resistance for detecting or checking measured information. An automatic dialing unit 2 transmits a subscriber's line address signal corresponding to a meter-reading and/or controlling terminal equipment by an indication of the central processor 1 through a junction line 5 to the automatic telephone switching system 6 and releases a switching connection by an indication of the meter-reading and/or controlling unit 3 or the central processor 1. An analog-digital converter 4 digitalizes a voltage drop of a detecting resistor progressively obtained by the meter reading and/or controlling unit 3, under control of the central processor 1 and transmits it to the central processor 1.

The terminal of the subscriber's telephone line 7 addressed by the automatic telephone switching system 6 and directly extended to the meter-reading and/or controlling unit 3, is connected through a coupler unit 9 of a meter-reading or controlling terminal equipment 8 to a subscriber's telephone set 14. The coupler unit 9 connects a scanner unit 10 to the subscriber's telephone line 7 by control of the meter-reading and/or controlling unit. The scanner unit 10 scans an unknown resistance of an encoder 11 interlocked to a meter 12 and/or the known predetermined resistance (not shown).

The coupler unit 9 controls the operation of controlled equipment 13 at the terminal side. A resistor having a predetermined resistance is inserted in a predetermined scanning position of the scanner unit 10 depending upon the operation of the controlled equipment 13.

A meter-reading connection exchange office unit 15 is controlled by the meter-reading and controlling unit 3 through one wire of a communication link of the automatic switching system 6 and a junction line, and consists of an encoder connecting unit 17 set up for each subscriber connected to a resistive encoder 18 interlocked to a meter 19 centrally set up in the automatic exchange office. A scanner unit 16 scans the unknown resistance of the resistive encoder 18 and a known predetermined resistance which is commonly used by the subscribers.

Figure 5:
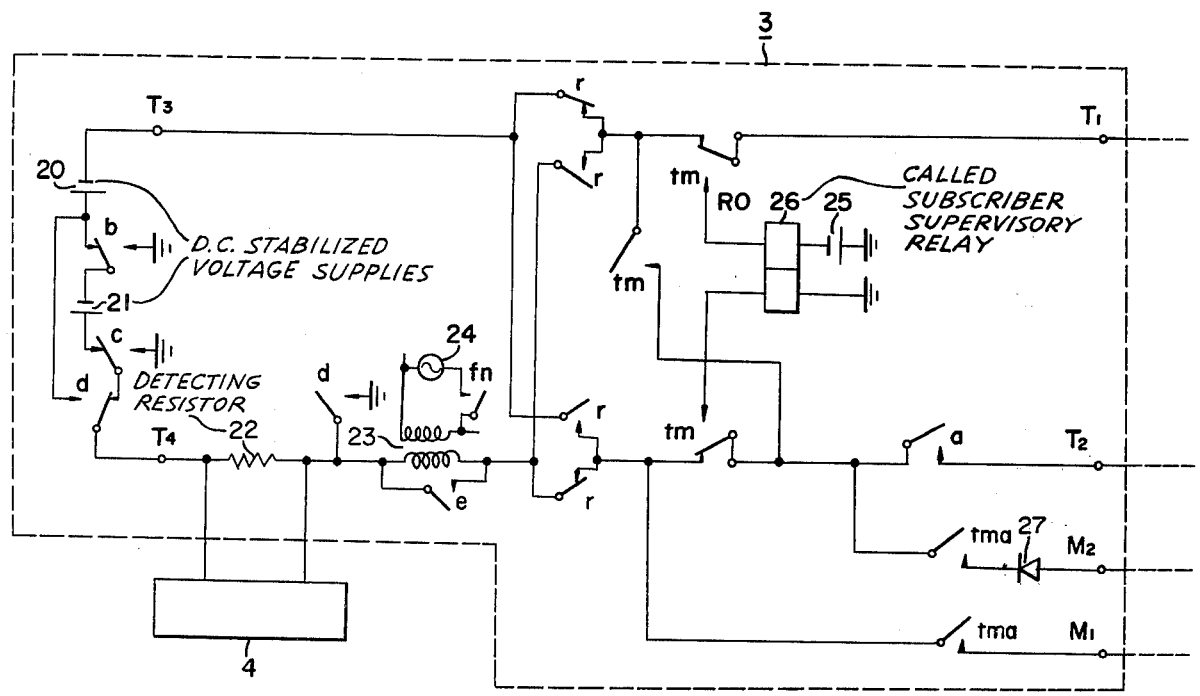
FIG. 5 is a circuit diagram of a meter-reading and/or controlling unit located at the central station according to the present invention.

FIG. 5 is a circuit diagram of the meter-reading and controlling unit 3 and the same comprises D.C. stabilized voltage supplies 20 and 21 and a detecting resistor 22. A voltage drop caused by the current passing through resistor 22 is applied to the analog-digital converter 4. The unit 3 further comprises a transformer 23 for combining an A.C. address signal supply 24 with a D.C. voltage; a D.C. power supply 25; a called subscriber supervisory relay 26 for finding the subscriber's origination during reception of the meter-reading signal for the meter 19 centrally set up in the automatic exchange office; and a diode 27. The coupler unit 9 of the meter-reading and/or controlling terminal equipment shown in FIG. 6 comprises a thyristor 32; a unijunction transistor 33; a winding of a coupling relay 28; zener diodes 29, 34 and 36; resistors 37, 39 and 40; a capacitor 38; a surge voltage absorbing element 41.

Figure 7:
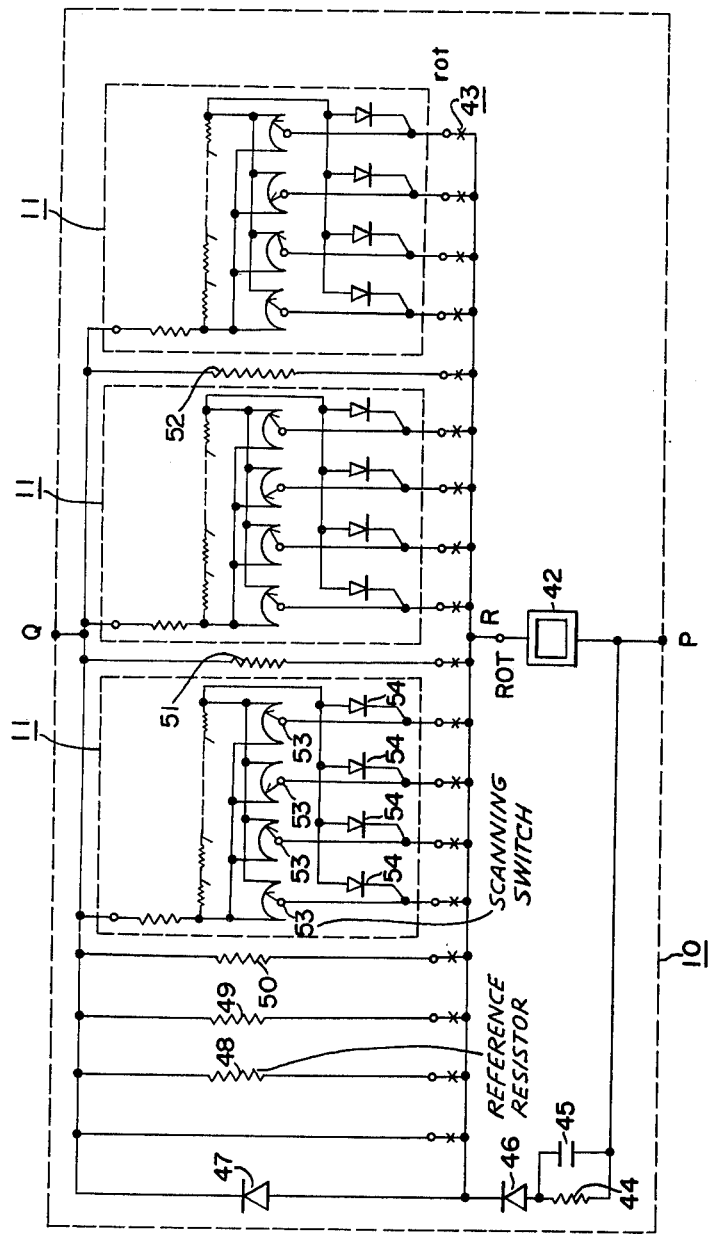
FIG. 7 is a circuit diagram of a scanner unit and a resistive encoder portion of the meter-reading terminal equipment of the present invention.

The scanner unit 10 comprises a winding of a single-phase stepping motor 42, a group of switch contacts 43 scanned by the stepping motor; diodes 46 and 47; resistors 44, 48, 49 and 50; and a capacitor 45. In FIG. 7, the scanner unit 10 is shown in more detail and comprises a reference resistor 48 having a known resistance; a resistor 49 having a predetermined resistance corresponding to a subscriber's number or customer number; and resistors 50, 51 and 52 having predetermined resistances corresponding to each type of meter [electric, gas and water service]. Each encoder 11 is a 4-figure encoder having 4 scanning switches 53 interlocked to the customer's meter.

Figure 6:
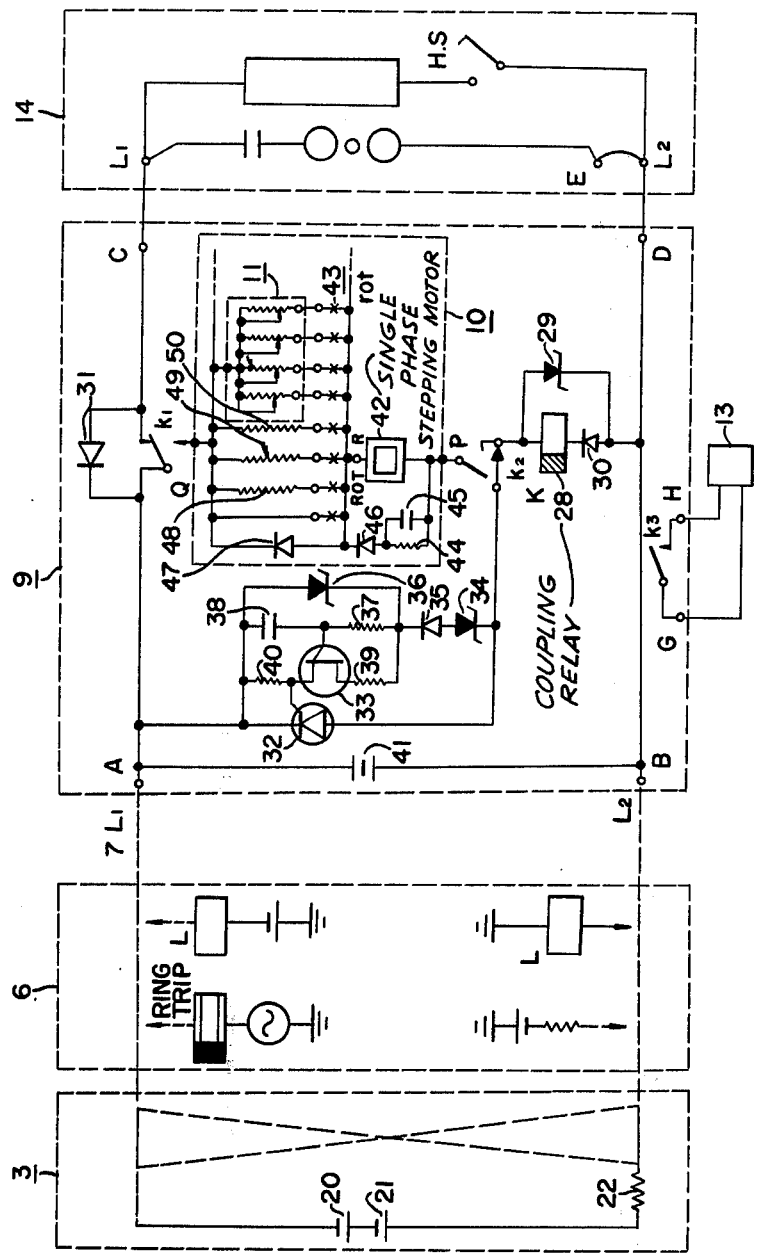
FIG. 6 is a circuit diagram of a meter-reading and/or controlling terminal equipment according to the present invention.

Referring now to FIGS. 5, 6 and 7, the operation when one coupler unit 9 is connected to one subscriber's line, is illustrated, progressively. The automatic dialing unit 2 transmits a predetermined subscriber's line address signal by the program-control of the central processor 1 whereby the meter-reading and controlling unit 3 is connected in series to the subscriber's line 7 by the automatic switching system 6. First, when a contact γ of the meter-reading and controlling unit 3 is operated and a contact a closed, the D.C. stabilized voltage supplies 20 and 21 are connected in series to impress an alert voltage to the communication link. The thyristor 32 is not turned on and the inductance of the transformer 23 prevents the telephone set bell from ringing by the charging current of the bell circuit capacitor. Consequently, a contact e is closed. A voltage drop E ∞ of the detecting resistor 22 produced by a steady current passing through the detecting resistor 22, is digitally measured by the analog-digital converter 4. The line insulation resistance can be derived from the value $E_\infty$. The ground insulation resistance and a contact failure of the telephone link are tested by controlling the contacts $b$, $c$, $d$, $\gamma$ and $e$. When the measured values are within the standard values, respectively, the telephone link condition is recognized to be in good condition.

The contacts $b$, $c$, and $d$ are then released and the contacts $\gamma$ and $e$ are accordingly released. The thyristor 32 of the coupler unit 9 is then turned on and a K relay 28 is alerted in the meter-reading or controlling terminal equipment 8.

The gate of thyristor 32 is connected to the anode of the thyristor 32 through a timing circuit comprising a unijunction transistor 33, a diode 35 and a Zener diode 34 having a break down voltage over the automatic telephone exchange main battery voltage. Accordingly, the thyristor 32 is not turned on by the exchange main battery in the normal condition. During the ringing period, the maximum positive voltage impressed on $L_1$-wire is a voltage which is the sum of the ringing voltage and the telephone exchange main battery voltage, while the maximum positive voltage impressed on an $L_2$-wire is a voltage representing the reduction of the telephone exchange main battery voltage from the ringing voltage.

The thyristor 32 is not turned on in either of said cases so that the subscriber's call is not interrupted.

The timer circuit consisting of the unijunction transistor 33, a Zener diode 36, resistors 37, 39, 40 and a capacitor 38, prevents an erroneous turn-on of the thyristor 32 by the induced transverse surges caused by the hook-on or the dialing, and keeps the gate voltage more than the minimum gate trigger voltage and less than the peak gate voltage (forward), within an expected line resistance.

When a K-relay 28 is operated, terminals P and Q of the scanner unit 10 are connected in series with a winding of the K-relay 28 and a diode 30 between both wires of the communication link and the circuit including the thyristor 32 is disconnected. The K-relay 28 is latched on, and the stepping motor 42 is excited and is turned one step.

In this condition, some adjacent two sets of a group of switch contacts 43 scanned by the stepping motor 42 are closed.

The diode 46, the resistor 44 and the capacitor 45 are connected in parallel to a self-inductance winding of the stepping motor 42 in order to maintain the latch-on of the K-relay 28. Since the diode 47 is connected in parallel to the resistor which is connected in series to the scanned switch contact between the terminals R and Q, it is possible to increase the exciting current of the winding of the K-relay 28 and the stepping motor 42.

A diode 31 is inserted, in series, to the telephone line at a $k_1$ contact by the operation of the K-relay 28. Accordingly, even though the D.C. voltage polarity applied from the meter-reading and/or controlling unit 3 to the telephone line is inverted, the electric charge on the ring condenser of the telephone set 14 is not discharged during the meter-reading, so that the bell does not ring. When the contacts $e$ and $\gamma$ of the meter-reading and/or controlling unit 3 are operated, the D.C. voltage source polarity applied to the telephone line is inverted, and the stepping motor 42 is further turned one step. In this condition, only one set of a group of switch contacts 43 is closed. The voltage drop steady value of the detecting resistor 22 of the meter reading and/or controlling unit 3 in this condition, is measured by the analog-digital converter 4 as with the above. In this case, the winding of the K-relay 28 is shunted by a Zener diode 29. However, the K-relay has a slow release characteristic, and accordingly, the operation thereof is held. The diode 29 increases the exciting current of the stepping motor 42, so that the system of this invention can be applied to a long and distant telephone line having a high line resistance together with the effects of the K-relay alert circuit having the thyristor 32 and the diode 47.

The reason the Zener diode 29 is connected in parallel to the K-relay winding 28, is to prevent an erroneous alert of the K-relay 28 with momentary induced transverse surges caused by hook on or dialing during the telephone call. Consequently, the D.C. voltage polarity applied to the telephone line is inverted under the control of the central processor 1, so that the stepping motor is progressively rotated. Accordingly, the voltage drop of the detecting resistor 22 caused by the steady current flowing therethrough is progressively measured on every other step in the condition that the output resistance of each figure of the encoder 11, or the resistor having the known predetermined resistance is connected, between the terminals Q and R.

In FIG. 7, a group of switch contacts 43 has 18 sets of switch contacts arranged roundly and some one set of the switch contacts is progressively closed on every other step, and the adjacent two sets of the switch contacts are closed in the middle step. The resistor 48 having a known normal resistance $\gamma_n$, the resistor 49 having a predetermined resistance $\gamma_c$ corresponding to subscriber's telephone number or customer number, the resistor 50 having a predetermined resistance $\gamma_E$ corresponding to a power meter, the output resistances of the encoder corresponding to a power meter indexes of a thousand figure, a hundred figure, a ten figure and a unit figure, the resistor 51 having a predetermined resistance $\gamma_G$ corresponding to a gas meter, the output resistances of the encoder corresponding to the gas meter indexes of a thousand figue, a hundred figure, a ten figure and a unit figure, the resistor 52 having the predetermined resistance $\gamma_W$ corresponding to a water suply meter, and the output resistances of the encoder corresponding to the water supply meter indexes of a thousand figure, a hundred figure, a ten figure, and a unit figure are progressively connected between the terminals R and Q on every other step from the scanning step wherein the terminals R and Q of the scanner unit 10 are shorted.

Among the measured values of voltage drop of the detecting resistor 22 gained by scanning one round, the maximum measured value is designated as $E_o$ and the measured value in the next measuring step is designated as $E_{\gamma_n}$. The measured value gained in the measuring step forward by the predetermined number of steps from the step giving the measured value $E_o$, in the condition connecting the unknown resistance $x$ of the encoder, is designated as $E_x$.

The resitance $x$ of the encoder can be calculated by the following equation derived from the theory of four-terminal network:

$$x = \gamma_n \cdot \frac{(E\infty - E_{\gamma_n})(E_o - E_x)}{(E_x - E\infty)(E_{\gamma_n} - E_o)}$$

Accordingly, the meter index can be detected by calculation under the control of the central processor 1. Known resistors $\gamma_C$, $\gamma_E$, $\gamma_G$ and $\gamma_W$ are respectively calculated by said method from the measured values at the measuring steps wherein the known resistors $\gamma_C$, $\gamma_E$, $\gamma_G$ and $\gamma_W$ are connected between the terminal R and Q, and then the resistances are respectively compared with the known predetermined values. Accordingly, it is possible to check an erroneous connection of the telephone switching system or to confirm a type of meter which will be read.

When the controlled equipment 13 is provided at a terminal side, the operation of the controlled equipment 13 is controlled at a contact $K_3$ by the operation of the K-relay 28 and the predetermined known resistance indicating the operation of the controlled equipment 13 is connected at the contact associated with the controlled equipment 13 instead of the resistor 49 showing type of the power meter for instance.

The answer back signal of the controlled equipment can be obtained by calculating and referring the resistance as stated above.

After meter-reading or controlling as stated above, if the time of application of the D.C. voltage polarity positive to the telephone line $L_1$ is longer than the releasing time of the K-relay 28, the K-relay releases. When the automatic dialing unit 2 is controlled by the central processor 1 so as to break the D.C. loop of the telephone line, the automatic switching train 6 releases and returns to its normal condition. Incidentally, the surge voltage absorbing element 41 prevents an erroneous alerting and self sustaining of the K-relay 28 by the surge voltage induced on the telephone line.

During the signal receiving period for the meter-reading or controlling if the subscriber lifts his receiver for an originating call, the K-relay 28 is shorted to release it at the low resistance circuit of the telephone set and the alert circuit of the K-relay is shorted. Accordingly, even though the contact $\gamma$ of the meter-reading and/or controlling units 3 repeats the operation and the release, the K-relay is not alerted and the diode 31 is shorted at the contact $K_1$, and the voltage drop of the detecting resistor 22 measured every other step is continuously the same value. Accordingly, when the subscriber's originating call is applied, the central processor 1 controls the automatic dialing unit 2 so as to break the D.C. loop and to release the automatic switching system 6 whereby the originating call takes preference.

The diodes 46 and 47, the resistor 44 and the capacitor 45 are effective for spark quenching a group of the scanned switch contacts 43 and the scanned switch contact 53 of the encoder 11.

The alerting circuit of the K-relay 28 is always bridged to the communication link. However, the bridging impedance is quite large so that the insertion loss during the telephone calling is quite small. Accordingly it is unnecessary to disconnect the circuit during telephone calling. It is further unnecessary to change any house wiring of a telephone set and it is unnecessary to provide any individual power supply for meter-reading at terminals, in accordance with the system of this invention. Furthermore, Fritterung voltage is applied to the scanner contact, so that it is possible to prevent a contact fault caused by a Coherer effect.

When the alerting voltage is higher than a measuring voltage and is also higher than the sum of a maximum ringing voltage and a telephone exchange main battery voltage, it is possible to cross-connect two of the coupler units 9 to the communication link as shown in FIG. 6 so as to address and alert selectively by the polarity of the alerting voltage. However, a low voltage is preferable because an application of high voltage to the communication link may be dangerous to a person concerned. When the alerting voltage is the same as the measuring voltage, and is lower than the sum of the ringing voltage and the telephone exchange main battery voltage, the coupler units 9 shown in FIG. 8 are used in order to attain the address and alert only by cross-connecting two of the coupler units to the same communication link.

Figure 8:
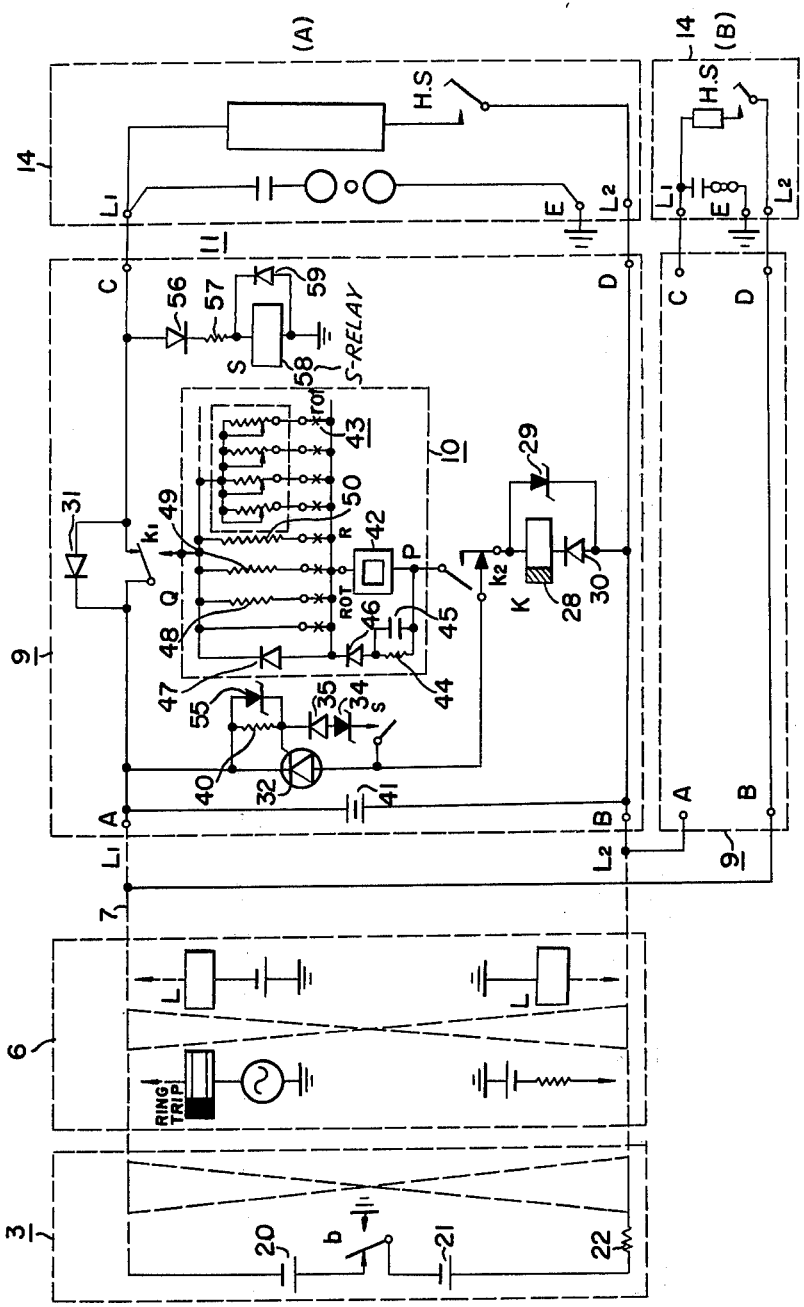
FIG. 8 is a circuit diagram of a coupler unit and related equipment when two coupler units, alerted by a D.C. voltage, are cross-connected to a telephone line.

In FIG. 8, a diode 56 is connected in series to the winding of S relay 58 between a terminal C of the coupler unit corresponding to each subscriber on a two-party line, and ground. The diode 35 and Zener diode 34 are connected by a contact of relay S in series between the anode and the gate of the thyristor 32.

As stated above, the meter-reading and/or controlling unit 3 is connected to the subscriber's telephone line 7 and the voltage drop $E \infty$ caused by the steady current across the detecting resistor 22 is measured at the time the contacts $\gamma$, $a$ and $e$ of the meter-reading and/or controlling units 3 operate and subsequently the above-mentioned various tests of the line are performed. When the telephone line (communication link) conditions are maintained over the standard values, the voltage of the D.C. voltage supply 21 is applied to the telephone line ($L_1$ line) if the party A subscriber number of the two-party line is dialed for connection, by operating the contact $b$ following the operation of the contacts $\gamma$ and $a$, so that the S-relay 58 of the coupler units 9 corresponds to the party A subscriber operates. On the other hand, the alerting voltage is applied to telephone line ($L_2$ line), if the party B subscriber number of the two party subscriber's line is dialed for connection so that the S-relay of the coupler units corresponds to the party B subscriber operates.

Subsequently, when contact $\gamma$ of the meter-reading and/or controlling units 3 is released and the contact $b$ is further released, the S-relay 58 of the coupler units releases; however it has a delay-release feature caused by the diode 59, so that the thyristor 32 is turned on during the delay-release of the make contact s so as to operate the K-relay 28 in the coupler unit 9.

The meter-reading or controlling operation followed is similar to those stated above. The S-relay 58 is prevented by the diode 56 to operate with the impressed voltage between two wires of the communication link. Accordingly, when one of the two-party lines is under the meter-reading or controlling, the other line is not interrupted. Although the S-relay 58 is actuated by a ringing current during the telephone ringing, the K-relay 28 is not erroneously operated so that there is no trouble in receiving the ringing current, because the Zener diode 34 in the alerting circuit of the thyristor 32, has a break down voltage greater than the telephone exchange main battery voltage. When the connection is released after the transmission of the ringing current and before the called side answers, the K-relay 28 is not erroneously operated. The resistor 57 limits the ringing current which partially pass to the circuit of the S-relay 58, so that the erroneous operation of the ring trip relay in the automatic telephone switching system is prevented before the called subscriber answers.

Figure 9:
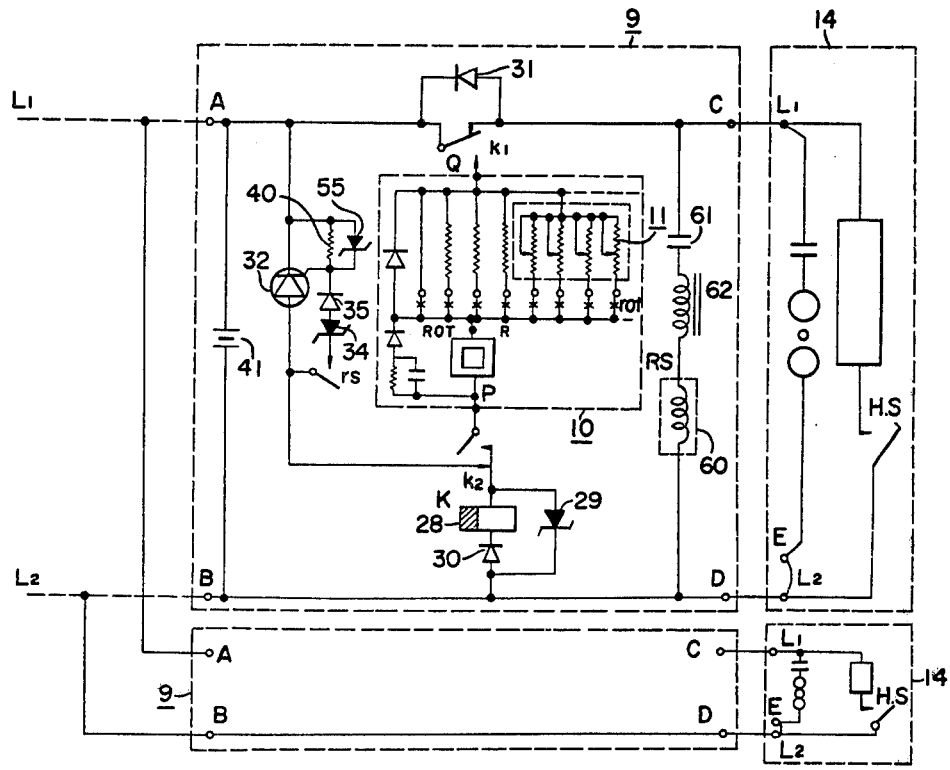
FIG. 9 is a circuit diagram of coupler units connected in parallel to a telephone line which are alerted by an A.C. address and alert signal.

In FIG. 9, a plurality of the coupler units 9 are connected in parallel to the same communication link which are addressed by the A.C. address signal. A series resonant circuit comprising a capacitor 61 and a selfinductance 62 which is tuned with the A.C. address signal corresponding to the coupler unit, and reed selector 60 are connected in series between terminals C and D of the coupler unit 9. When contact $f_n$ corresponding to the coupler units 9 are operated after the above-mentioned measurement of $E\infty$ and the line tests are performed under the control of the central processor 1, and after the release of the contacts $b, c, d, e$ and $\gamma$, the voltage of the D.C. voltage supply 20 and 21 are superposed to the A.C. voltage having a frequency corresponding to the coupler unit, and then they are applied to the communication link.

At the terminal side, the reed selector 60 corresponding to the A.C. frequency of the address signal is actuated, so that the thyristor 32 is turned on by he make contact $\gamma_S$ so as to alert the K-relay 28. The meter-reading or controlling operation is similar to those stated above.

Figure 10:
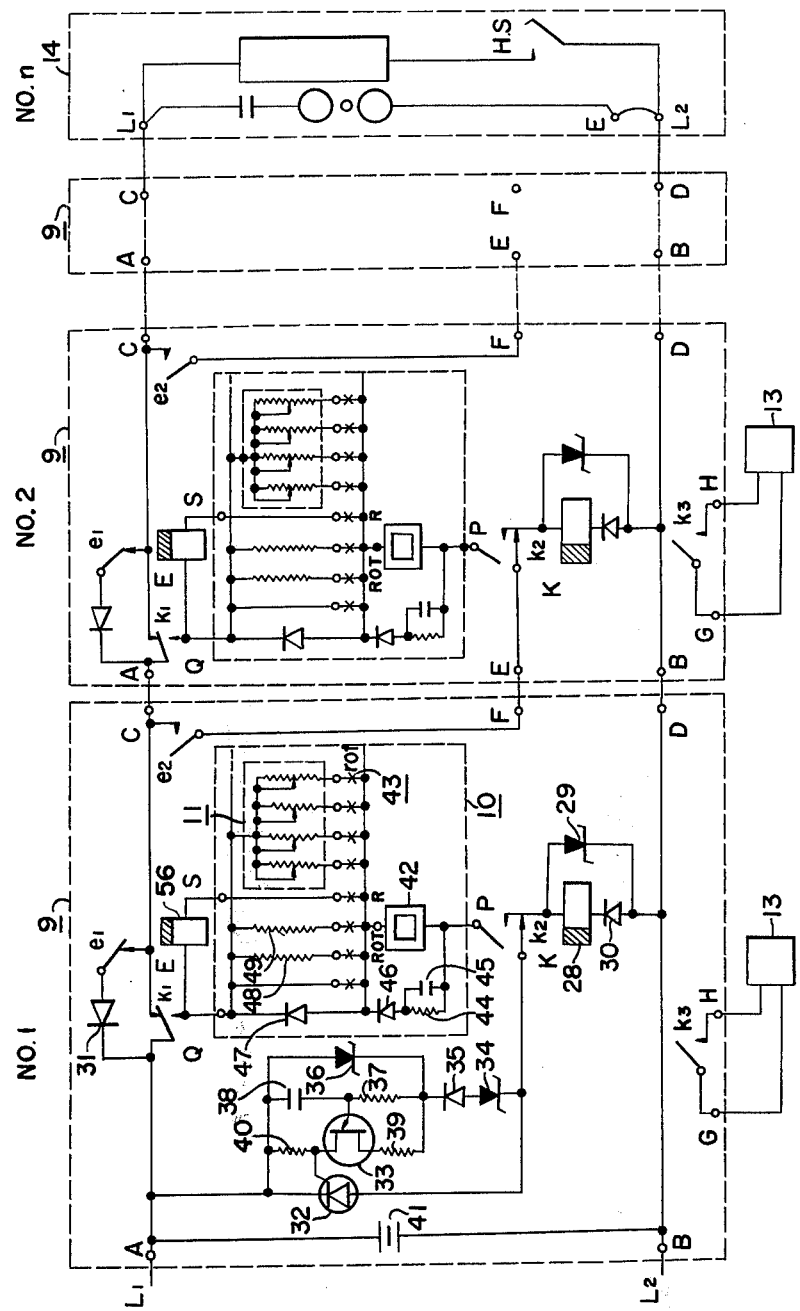
FIG. 10 is a diagram of a circuit for series connecting a plurality of coupler units alerted by a D.C. voltage on a telephone line.

In FIG. 10, a plurality of the coupler units 9 is connected in series to the same communication link. The winding 56 of the address relay-Erelay is connected in series to the scanned switch at the scanning step forward by the predetermined number of steps from the scanning step wherein the terminals Q and R of the scanner units 10 corresponding to the No. 1 to No. (n-1) coupler units are shorted. In FIG. 10, when the No. 1 measuring step designates the scanning step wherein the terminals Q and R are shorted, the No. 4 measured step is considered as the step connecting E-relay winding 56. A make contact $e_2$ of the E-relay is connected between the terminals C and F of the coupler units 9.

The terminal F is connected to the terminal E of the coupler unit 9 in the next alerting order and the terminal E is connected through the contact $K_2$ to the winding 28 of the K-relay. The series circuit of the break contact $e_1$ and the diode 31 is connected in parallel to the break side of the contact $K_1$. After alerting the No. 1 coupler unit, the stepping motor 42 of the No. 1 scanner unit 10 is driven and the E-relay 56 is actuated by a positive D.C. voltage on the wire $L_1$ at a position scanned forward by the predetermined steps from the scanned position, wherein the maximum value $E_o$ is obtained in one scanning round. The operation circuit of the K-relay of the coupler unit being placed in the second alerting order is prepared by the make contact $e_2$.

If the period applying the positive polarity D.C. voltage to the wire $L_1$ is over the release time of the K-relay 28, the K-relay 28 is released to disconnect the operation circuit of the E-relay 56, and then, during the release lag of the contact $e_2$, the polarity of the D.C. voltage applied to the communication link is inverted. The K-relay of the coupler unit in the second alerting order is alerted so as to connect the second scanner unit to the communication link, so that meter-reading or controlling can be performed as stated above.

The break contact $e_1$ prevents the erroneous operation of the K-relay in the coupler unit in the next alerting order during the period the E-relay 56 hesitates to release after its operation in the scan for meter-reading or controlling.

Figure 11:
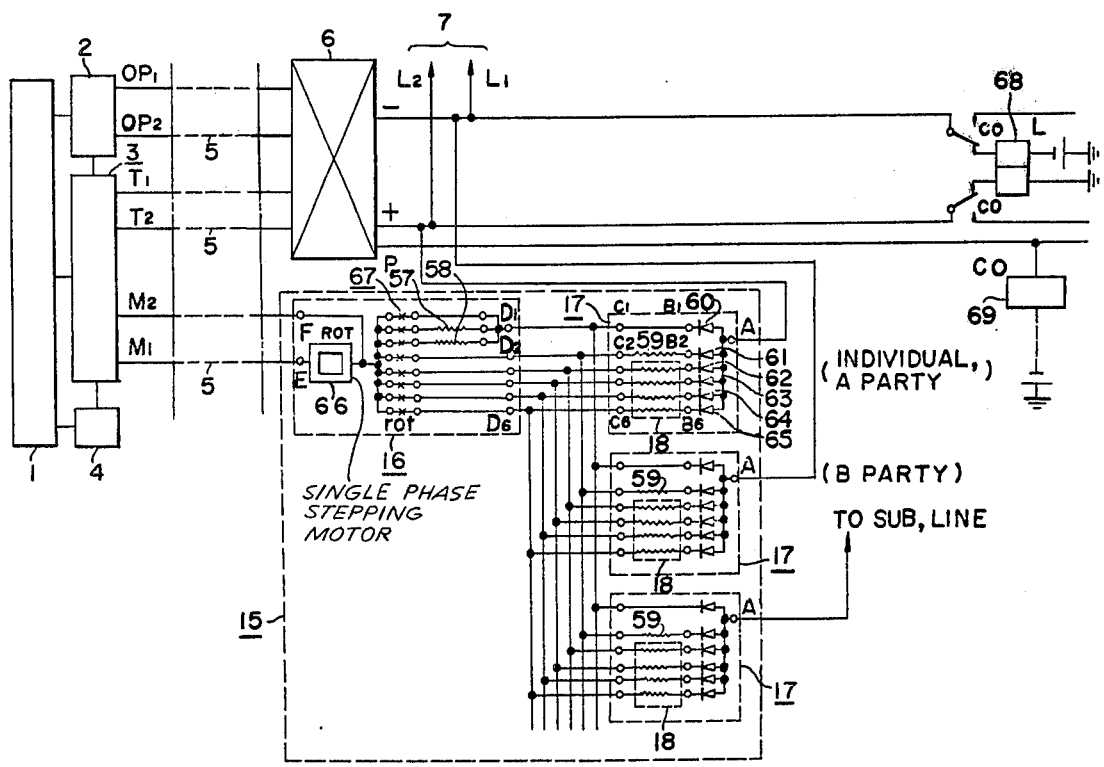
FIG. 11 is a circuit diagram of meter-reading connection exchange office unit used for monitoring a meter and related equipment centrally located in an automatic exchange office.

FIG. 11 is a circuit diagram of the meter-reading connection exchange office unit 15 used for meter-reading the telephone subscriber's meter which is centrally equipped in the telephone exchange office. The anodes of diodes 60 − 65 of the encoder connecting unit 17 equipped for each subscriber are multi-connected to the line $L_2$ of the subscriber's line for an individual line subscriber or a party A subscriber, and are multi-connected to the line $L_1$ of the subscriber's line, for a party B subscriber.

One terminal side of a goup of switch contacts 67 scanned by a single phase stepping motor 66 for common use by the subscribers, is multi-connected to one terminal of the coil 66 of the stepping motor. The other terminals of the four sets of the scanned switch contacts 67 are respectively multiconnected to each output resistance of the resistance encoder 18 for each figure which is interlocked to the four figure telephone subscriber's meter. The other terminal of one set of the scanned switch contacts 67 is multiconnected to the resistors 59 having a resistance corresponding to each subscriber's number.

The other terminals of the resistors 59 or each output resistance of the encoders are respectively connected to the cathodes of the diodes 61-65. The other three sets of the scanned switch contacts 67 are respectively multi-connected to the cathodes of the diodes 60, directly or in series to the predetermined resistor 57 or 58. The cathodes of the diodes 60 for each subscriber are multi-connected to one another.

when contacts $t_m$, $t_{ma}$ and a of the meter-reading and controlling unit 3 are operated by the program-control of the central processor 1 before transmitting a subscriber's telephone line address signal from the automatic dialing unit 2, an R0 relay winding 26 is connected in series to the D.C. power supply 25 to the communication link, and the stepping motor 66 in the scanner unit 16 of the meter-reading connection exchange office unit 15 is energized in series with the detecting resistor 22 and the diode 27 through the junction line 5 by the D.C. stabilized voltage supplies 20 and 21, so as to turn one step. In this condition, both of some two adjacent sets of a group of the scanned switch contacts 67 by the stepping motor 66 are turned on. When the contact $\gamma$ of the meterreading and controlling unit 3 is operated, the D.C. stabilized voltage supplies 20 and 21 are applied in series with the detecting resistor 22 between the terminals $T_2$ and $M_1$. The steady voltage drop of the detecting resistor 22 is then measured by the analog-digital converter 4. This value is designated as $E_{t\,\infty}$. Subsequently, the automatic dialing unit 2 transmits the predetermined subscriber's telephone line address signal by the program control of the central processor 1, so that the automatic telephone switching system 6 connects the meter-reading and controlling unit 3 to the subscriber's telephone line. In this condition, the meter-reading and controlling units 3, one wire of the metering train of automatic switching system 6, the encoder connecting unit 17 and the scanner unit 16 are connected together so that the stepping motor 66 of the scanner unit 16 is excited in opposite directions so as to turn one further step. At this moment, only one set of a group of the scanned switch contacts 67 is turned on so that the voltage drop of the detecting resistor 22 of the meter-reading and controlling unit 3 is measured as with the above. Subsequently, the release and operation of the contact γ of the meter-reading and controlling unit 3 is repeated under the control of the central processor 1 so as to turn the stepping motor 66, progressively, so that the steady voltage drop of the detecting resistor 22 caused by passing current through the closed circuit connecting the output resistance of the encoder 18 for each figure or the predetermined resistor is measured on every other step. The resistor 57 is the normal resistor having a known resistance $\gamma_n$, the resistor 58 is a predetermined resistor for the subscriber's meter-reading, the resistor 59 is a resistor having a predetermined resistance corresponding to the subscriber's number. The resistors 58 and 59 are respectively for checking purposes. The maximum measured value among the values measured during scanning in one round, is designated as $E_{to}$. The voltage drop of the detecting resistor 22 in the condition connecting the normal resistor 57 in series with the diode 60 between the terminals A and F of the meter-reading connection exchange office unit 15 at the next measuring step following the measuring step wherein $E_{to}$ is given, is designated as $E_{t\gamma_n}$.

The voltage drop of the detecting resistor 22 in the condition connecting an unknown encoder resistance $x$ at the measuring step which is forward a predetermined number of steps from the measuring step wherein the maximum value $E_{to}$ is given, is designated as $E_{tx}$. When the deviation of forward resistance of the diodes 60–65 of the encoder connecting unit 17 can be ignored, the resistance $x$ of the encoder can be calculated by the following equation, regardless the condition of the subscriber's telephone line 7 or the junction line 5.

$$x = \gamma_n \cdot \frac{(E_{t\infty} - E_{t\gamma_n})(E_{to} - E_{tx})}{(E_{tx} - E_{t\infty})(E_{t\gamma_n} - E_{to})}$$

The subscriber's meter index can be detected and calculated under the control of the central processor 1.

The confirmation of the meter-reading of the subscriber's meter and the check of an erroneous connection of the telephone switching system are performed by detecting the resistances of the resistor 58 and the resistor 59 by this manner and by checking them respectively with the predetermined resistance values.

When the subscriber lifts his handset for a call origination during the period receiving the meter-reading signal, the R0 relay 26 of the meter-reading and controlling units 3 is operated by the loop due to the telephone set. The automatic dialing unit 2 is controlled by the contact of the R0 relay 26 so as to provide a forced release of the switching connection.

As stated above, in the meter-reading of the meters which are centrally equipped in the telephone exchange office, the scanner unit 16 can be commonly used by a plurality of subscribers without a coupling relay for each subscriber, in comparision with the distant automatic meter-reading of meters for electric, gas and water services which are scattered in a broad area. It is enough for each subscriber to be equipped with only a resistive encoder associated with the meter and an encoder connecting unit having a small number of the diodes and an electric resistor, so that it is possible to perform the meter-reading quite economically.

Derivation of the equation described on page 11 or page 19 in the specification is as follows.

When a passive linear four-terminal network is loaded with an impedance $Z_2$, its input impedance $Z_1$, i.e. the ratio of the input voltage $V_1$ to the input current $I_1$, is determined from the following equation which is derived from the theroy of a four terminal network $$Z_1 = \frac{V_1}{I_1} = \frac{AZ_2 + B}{CZ_2 + D} \quad (1)$$

Here, A, B, C, and D are the well-known generalized network parameters called four general circuit prameters or cascade parameters, and there is the following relation between these parameters $$AD - BC = 1 \quad (2)$$

Substituting $Z_1 = Z_{11}$, $Z_{12}$, $Z_{13}$, or $Z_{1x}$, and $Z_2 = Z_{21}$, $Z_{22}$, $Z_{23}$, or $Z_{2x}$ in the above equation (1), we get $$Z_{11} = \frac{AZ_{21} + B}{CZ_{21} + D}$$

$$Z_{12} = \frac{AZ_{22} + B}{CZ_{22} + D}$$

$$Z_{13} = \frac{AZ_{23} + B}{CZ_{23} + D} \quad (3)$$

$$Z_{1x} = \frac{AZ_{2x} + B}{CZ_{2x} + D}$$

when the quantities $Z_{11}$, $Z_{12}$, $Z_{13}$, $Z_{1x}$, $Z_{21}$, $Z_{22}$, and $Z_{23}$ are known, the joint solution of the equations (2) and (3) gives the unknown quantitites $Z_{2x}$, A, B, C, and D. The solution of equations (3) results the following relation.

$$\frac{(Z_{11} - Z_{12})(Z_{13} - Z_{1x})}{(Z_{1x} - Z_{11})(Z_{12} - Z_{13})} = \frac{(Z_{21} - Z_{22})(Z_{23} - Z_{2x})}{(Z_{2x} - Z_{21})(Z_{22} - Z_{23})} \quad (4)$$

This conversion into the above equation (4) facilities the calculation of the unknown quantities $Z_{2x}$.

When the voltage drops across the detecting resistor caused by the input currents are expressed respectively as $E_1$, $E_2$, $E_3$, or $E_x$, in cases that the input voltage of a four-terminal network is constant and the four-terminal network is loaded with the impedances $Z_{21}$, $Z_{22}$, $Z_{23}$, or $Z_{2x}$, we may derive the following equation (5) from the relation (4):

$$\frac{(E_1 - E_2)(E_3 - E_x)}{(E_x - E_1)(E_2 - E_3)} = \frac{(Z_{21} - Z_{22})(Z_{23} - Z_{2x})}{(Z_{2x} - Z_{21})(Z_{22} - Z_{23})} \quad (5)$$

Accordingly, when the quantities $E_1$, $E_2$, $E_3$, $E_x$, $Z_{21}$, $Z_{22}$, and $Z_{23}$ are known, the solution of the equation (5) gives the unknown quantities $Z_{2x}$.

Supposing the particular case when $Z_{21} = \infty$, $Z_{22} = 0$, we can simplify the indirect measuring of the unknown load impedance $Z_{2x}$. When we express respectively the voltage drops across the detecting resistor caused by the input currents as $E\infty$, $E_o$, $E_{rn}$, or $E_x$, in cases that the output terminals of the four-terminal network is opened, shorted, or loaded with the resistor γn or X, we get the following relation.

$$\frac{(E\infty - E_o)(E_{rn} - E_x)}{(E_x - E\infty)(E_o - E_{rn})} = \frac{\gamma n - X}{\gamma n}$$

Hence, $$X = \gamma n \cdot \frac{(E\infty - E_{rn})(E_o - E_x)}{(E_x - E\infty)(E_{rn} - E_o)} \quad (6)$$

We may certify that the relations (4), (5), and (6) are obtained even if the linear four-terminal network is active, applying the principle of superposition.

The equations at page 11 or page 19 in the specification are corresponding to the equation (6), which is derived from the theory of a four-terminal network.

Obviously, numerous modifications and variations of the present invention are possible in light of the above teachings. It is therefore to be understood that within the scope of the appended claims, the invention may be practice otherwise than as specifically described herein.

I claim:

1. An automatic meter-reading system for reading a meter at a remote station over a communication link from a central station which comprises:
   A. meter-reading terminal equipment at the remote station comprising:
      an encoder for converting the indicative information of the meter into information in the form of ohmic resistance; and a scanner unit having:
      at least three predetermined resistors which have different predetermined resistance values from one another;
      a group of switches, each of which is respectively connected in series to an output resistance of the encoder or each of the predetermined resistors, and which are arranged in an predetermined sequence; and
      a scanner turning on the switches progressively and selectively;
   B. a meter-reading center at the central station comprising: a stabilized D.C. voltage supply;
      an electrical signal measuring apparatus for measuring the electrical signals caused by the current passing through input terminals of a four-terminal network including a communication link and for converting the electrical signals into a computer code which is transmitted to a central processor;
      a switch for automatically coupling the electrical signal measurement apparatus to the meter-reading terminal equipment over the communication link and for automatically applyingg stabilized D.C. voltage from the supply to input terminals of the four-terminal network after seizing the communication link under the control of a central processor;
   and
      wherein said central processor is connected to the meter reading terminal equipment through the communication link for controlling the operation of the switch in a meter-reading center, the electrical signal measuring apparatus, and the meter-reading terminal equipment for coupling the encoder to the communication link and for measuring the unknown resistance of the encoder over the communication link;
   C. means disposed in the meter-reading center for progressively turning on the switches in the scanner unit by driving the scanner under the control of the central processor; and
   D. means disposed in the meter-reading center for indirectly measuring the unknown output resistance of the encoder from at least three values of the predetermined resistors in the scanner unit and electrical signals measured by the electrical signal measuring apparatus while selectively connecting each of the predetermined resistors in the scanner unit or unknown output resistance of the encoder to output terminals of the four-terminal network including the communication link, by calculation based upon a set of the following relations for a passive linear four-terminal network $$Z_1 = \frac{AZ_2 + B}{CZ_2 + D}$$

Where $Z_1$ is the input impedance which is the ratio of the input voltage to the input current in case that the four-terminal network is loaded with an impedance $Z_2$ and A, B, C, and D are generalized network parameters termed four general circuit parameters or cascade parameters and there is the following relation between these parameters
$AD - BC = 1.$ 2. An automatic meter-reading system for reading a meter at a remote station over a telephone line from a central station, which comprises:
   A. meter-reading terminal equipment at the remote station comprising:
      an encoder for converting the indicative information of the meter into information in the form of ohmic resistance; a scanner unit having;
      a plurality of predetermined resistors which have different predetermined resistance values from one another;
      a group of switches, each of which is respectively connected in series to an output resistance of the encoder or each of the predetermined resistors, and which are arranged in a predetermined sequence; and
      a scanner turning on the switches progressively and selectively;
   and
      a coupler unit having:
      an alert and coupling signal detector for detecting an alert and coupling signal from a meter-reading center; and a coupling relay responsive to the coupling signal received by the detector for connecting the scanner unit and the encoder to a telephone line;
   B. a meter-reading center at the central station comprising: an automatic dialing unit;
      a stabilized D.C. voltage supply;
      an electrical signal measuring apparatus for measuring the electrical signals caused by the current passing through the input terminals of a four-terminal network including a communication link and for converting the electrical signals into a computer code which is transmitted to a central processor;
      a switch for automatically coupling the electrical signal measurement apparatus to the meter-reading terminal equipment over the communication link and for automatically applying stabilized D.C. voltage from the supply to input terminals of the four-terminal network after seizing the communication link under the control of a central processor;
   and
      wherein said central processor is connected to the meter-reading terminal equipment through the communication link for controlling the operation of the automatic dialing unit, the switch in a meter-reading center, the electrical signal measuring apparatus, and the meter-reading terminal equipment for coupling the encoder to the communication link and for measuring the unknown resistance of the encoder over the communicating link;

C. means disposed in the meter-reading center for progressively turning on the switches in the scanner unit by driving the scanner under the control of the central processor; and D. means disposed in the meter-reading center for indirectly measuring the unknown output resistance of the encoder from at least two values of the predetermined resistors in the scanner unit and electrical signals measured by the electrical signal measuring apparatus while seizing the meter-reading terminal equipment before alerting or selectively connecting each of the predetermined resistors in the scanner unit or unknown output resistance of the encoder to output terminals of the four-terminal network including the communication link, by calculation based upon a set of the following relations for a passive linear four-terminal network $$Z_1 = \frac{AZ_2 + B}{CZ_2 + D},$$

where $Z_1$ is the input impedance which is the ratio of the input voltage to the input current in case that the four-terminal network is loaded with an impedance $Z_2$ including an opencircuited output and A, B, C, and D are generalized network parameters termed four general circuit parameters or cascade parameters and there is the following relation between these parameters $$AD - BC = 1.$$

3. An automatic meter-reading system as claimed in claim 2, which further comprises so as to make the system operative over a long distant communication link by a low voltage of D.C. voltage supply;

A. means for connecting the winding of said coupling relay in series with said alert and coupling signal detector and a switching contact of said coupling relay between two wires of the telephone line in normal condition, and for forming self-holding circuit of said coupling relay through said scanner unit after operating said coupling relay;

B. a diode connected in parallel with the winding of said coupling relay so as to increase the driving current for said scanner when D.C. voltage having the opposite polarity to the alerting polarity is applied from said meter-reading center to communication link; and C. a diode connected in parallel to said predetermined resistor or output resistance of said encoder, so as to increase the driving current for said scanner when D.C. voltage having the same polarity as the alerting polarity is applied to communication link.

4. An automatic meter-reading system as claimed in claim 2, which further comprises so as to make use of existing telephone subscriber's line:

A. means for inserting a diode in series with the telephone subscriber's line at the break contact of said coupling relay during its operation period to prevent the polarity reversal of the D.C. voltage applied to said meter-reading terminal equipment from ringing the telephone bell or operating an apparatus for indicating incoming signal reception; and B. means for detecting the condition wherein the electrical signals measured by said electrical signal measuring apparatus have the same value at several measuring steps of said scanner, due to release of said coupling relay by the loop of a telephone set, so as to detect the subscriber's call origination during meter-reading.

5. An automatic meter-reading system as claimed in claim 2, which further comprises so as to make two said coupler units connect to one telephone line;

A. an address relay provided in said alert and coupling signal detector in said coupler unit, the winding of which is connected in series with a diode between one of the telephone set connecting terminals of said coupler unit and ground, and which actuates said coupling relay with its operating contact;

B. means for actuating said coupling relay by switching D.C. voltage to ground for said address relay to D.C. voltage between two wires of the telephone line after actuating said address relay; and c. means for cross-connecting two of said coupler units to the telephone line.

6. An automatic meter-reading system as claimed in claim 2, which further comprises so as to make a plurality of said coupler units connected to one telephone line:

A. an A.C. signal supply for supplying A.C. voltage having a frequency corresponding to each of said coupler unit as an address signal superimposed with D.C. voltage as alert and coupling signal;

B. an address relay resonating with said address signal, provided in said alert and coupling signal detector in said coupler unit; and C. means for actuating said coupling relay by the operation of said address relay resonating with said address signal.

7. An automatic meter-reading system as claimed in claim 2, which further comprises so as to make a plurality of said coupler units connect to one telephone line:

A. an address relay provided in said coupler unit, the winding of which is connected in series to said switch turning on at the position scanned forward by the predetermined number of steps from the scanned position connecting said predetermined resistor in said scanner unit to output terminals of said four-terminal network including a communication link;

B. means for actuating said address relay at the scanned position connecting the winding of said address relay to the telephone line until the release of said coupling relay of said coupler unit; and C. means for alerting the next coupler unit by virtue of slow release feature of said address relay after the release of said coupling relay of said coupler unit.

8. An automatic controlling system for controlling equipment at a remote station over a communication link from a central station which comprises:

A. a scanner unit at a remote station having:
  a plurality of predetermined resistors which have different predetermined resistance values from one another;
  a group of switches, each of which is respectively connected in series to each of the predetermined resistors and which are arranged in a predetermined sequence; and a scanner turning on the switches progressively and selectively;

B. a controlling center at a central station comprising: a stabilized D.C. volage supply;

an electrical signal measuring apparatus for measuring the electrical signals caused by the current passing through input terminals of a four-terminal network including a communication link and for converting the electrical signals into a computer code which is transmitted to a central processor;

a switch for automatically coupling the electrical signal measurement apparatus to the scanner unit at a remote station over the communication link and for automatically applying stabilized D.C. voltage from the supply to input terminals of the four-terminal network after seizing the communication link under the control of a central processor; and wherein said central processor is connected to the controlling terminal equipment through the communication link for controlling the operation of the switch in a controlling center, the electrical signal measuring apparatus, the scanner unit, and the controlled equipment at a remote station for coupling the scanner unit and the controlled equipment at a remote station to the communication link and for checking the predetermined resistance as an answer-back signal over the communication link;

C. means for connecting a predetermined resistor corresponding to the controlled condition of the equipment at a remote station in series to the switch turned on at the predetermined scanned position of the scanner by a contact associating with the operation of the equipment, when the equipment has been controlled from the controlling center;

D. means disposed in the controlling center for progressively turning on the switches in the scanner unit by driving the scanner under the control of the central processor; and E. means disposed in the controlling center for indirectly measuring the resistance of the predetermined resistor corresponding to the controlled condition of the equipment at a remote station from values of the predetermined resistors in the scanner unit and electrical signals measured by the electrical signal measuring apparatus while selectively connecting each of the predetermined resistors in the scanner unit or the predetermined resistor corresponding to the controlled condition of the equipment to output terminals of the four-terminal network including the communication link, by calculation based upon a set of the following relations for a passive linear four-terminal network $$Z_1 = \frac{AZ_2 + B}{CZ_2 + D}$$

where $Z_1$ is the input impedance which is the ratio of the input voltage to the input current in case that the four-terminal network is loaded with an impedance $Z_2$ and A, B, C, and D are generalized network parameters termed four general circuit parameters or cascade parameters and there is the following relation between these parameters $$AD - BC = 1.$$

9. An automatic meter-reading system for reading a subscriber's meter centrally equipped in an automatic telephone exchange office, which comprises:

A. an encoder for converting the indicative information of a subscriber's meter into information in the form of ohmic resistance; a stabilized D.C. voltage supply;

an electrical signal measuring apparatus for measuring the electrical signals caused by the current passing through input terminals of a four-terminal network including one wire of the communication link selected by the automatic telephone switching system and a line connecting the meter-reading connection exchange office unit and the meter-reading center and for converting the electrical signals into a computer code which is transmitted to a central processor;

a switch for automatically coupling the electrical signal measuring apparatus to the meter-reading connection exchange office unit through the communication link and for automatically applying stabilized D.C. voltage from the supply to input terminals of the four-terminal network after seizing the communication link under the control of a central processor; and wherein said central processor is connected to the meter-reading terminal equipment through the communication link for controlling the operation of the automatic dialing unit, the switch in a meter-reading center, the electrical signal measuring apparatus, and the scanner unit in the meter-reading connection exchange office unit for coupling the encoder to the communication link and for measuring the unknown resistance of the encoder over the communication link;

B. a meter-reading connection exchange office unit comprising:

an encoder connecting unit having a group of diodes for connecting together the encoder and the predetermined resistors in series with each of the diodes respectively to one wire of each subscriber line, the diodes preventing the causation of a cross-contact fault between the subscriber lines and preventing the formation of turnaround circuits to the encoder through another subscriber's encoder connecting unit;

a scanner unit for common use by a plurality of subscribers, having:

a plurality of predetermined resistors which have different predetermined resistance values from one another;

a group of switches arranged in a predetermined sequence, each of which is multiconnected to a plurality of subscriber's communication links in series with the diode in the encoder connecting unit and an output resistance of the encoder or each of the predetermined resistors; and a scanner turning on the switches progressively and selectively;

C. a meter-reading center at the telephone exchange office or the central station comprising:
an automatic dialing unit;

D. means disposed in the meter-reading center for progressively turning on the switches in the scanner unit by driving the scanner through one wire of a communication link of an automatic telephone switching system and line connecting the meter-reading connection exchange office unit and the meter-reading center under the control of the central processor; and E. means disposed in the meter-reading center for indirectly measuring the unknown output resistance of the encoder from values of the predetermined resistors in the scanner unit an electrical signals measured by the electrical signal measuring apparatus while selectively connecting each of the predetermined resistors in the scanner unit or unknown output resistance of the encoder to one wire of the communication link selected by the telephone switching system, by calculation based upon a set of the following relations for a passive linear four-terminal network $$Z_1 = \frac{AZ_2 + B}{CZ_2 + D}$$

where $Z_1$ is the input impedance which is the ratio of the of the input voltage to the input current in case that the four-terminal network is loaded with an impedance $Z_2$ and A, B, C, and D are generalized network parameters termed four general circuit parameters or cascade parameters and there is the following relation between these parameters $$AD - BC = 1.$$

10. An automatic meter-reading system as claimed in claim 9, which further comprises:

A. means for connecting a winding of a called subscriber supervisory relay and a D.C. voltage supply in series across a pair of conductors forming the communication link selected by an automatic telephone switching system at the time of forming a meter-reading circuit; and B. means for forcibly releasing the meter-reading connection upon a determination of the subscriber's call origination due to the operation of said called subscriber supervisory relay by the loop of a telephone set, in order to provide priority to the subscriber's call origination, when the subscriber lifts his handset for origination during the meter-reading period.

* * * * *

UNITED STATES PATENT AND TRADEMARK OFFICE
CERTIFICATE OF CORRECTION

PATENT NO. : 4,022,977
DATED : May 10, 1977
INVENTOR(S) : Nomura

It is certified that error appears in the above-identified patent and that said Letters Patent are hereby corrected as shown below:

Column 11, lines 64-65, delete "page 11 or page 19" and insert therefor --column 7 or column 11--.

Column 13, line 4, delete "page 11 or page 19" and insert therefor --column 7 or column 11--.

Claim 9, part "A" should read as follows:

--A. an encoder for converting the indicative information of a subscriber's meter into information in the form of ohmic resistance;--.

Claim 9, part "C" should read as follows:

--C. a meter-reading center at the telephone exchange office or the central station comprising:

an automatic dialing unit;

a stabilized D.C. voltage supply;

an electrical signal measuring apparatus for measuring the electrical signals caused by the current passing through input terminals of a four-terminal network including one wire of the communication link selected

UNITED STATES PATENT AND TRADEMARK OFFICE
CERTIFICATE OF CORRECTION

PATENT NO. : 4,022,977
DATED : May 10, 1977
INVENTOR(S) : Nomura

It is certified that error appears in the above-identified patent and that said Letters Patent are hereby corrected as shown below:

by the automatic telephone switching system and a line connecting the meter-reading connection exchange office unit and the meter-reading center and for converting the electrical signals into a computer code which is transmitted to a central processor;

a switch for automatically coupling the electrical signal measuring apparatus to the meter-reading connection exchange office unit through the communication link and for automatically applying stabilized D.C. voltage from the supply to input terminals of the four-terminal network after seizing the communication link under the control of a central processor; and wherein said central processor is connected to the meter-reading terminal equipment through the communication link for controlling the operation of the automatic dialing unit, the switch in a meter-reading center, the electrical signal measuring apparatus, and the scanner unit in the meter-reading connection exchange office unit for coupling the encoder to the communication link and for measuring the unknown resistance of the encoder over the communication link;--

UNITED STATES PATENT AND TRADEMARK OFFICE
CERTIFICATE OF CORRECTION

PATENT NO. : 4,022,977
DATED : May 10, 1977
INVENTOR(S) : Nomura

It is certified that error appears in the above-identified patent and that said Letters Patent are hereby corrected as shown below:

Column 19, line 2, after "and" insert --a--.

Column 19, line 9, delete "an" and insert therefor --and--.

Column 19, last line, delete "the of".

Signed and Sealed this

Eighteenth Day of October 1977

[SEAL]

Attest:

RUTH C. MASON
*Attesting Officer*

LUTRELLE F. PARKER
*Acting Commissioner of Patents and Trademarks*